United States Patent
Shpak

(10) Patent No.: US 12,457,639 B2
(45) Date of Patent: Oct. 28, 2025

(54) ANONYMOUS COLLECTION OF BROADBAND DIRECTIONAL TRANSMISSIONS

(71) Applicant: Deeyook Location Technologies Ltd., Tel Aviv (IL)

(72) Inventor: Eran Shpak, Tel Aviv (IL)

(73) Assignee: Deeyook Location Technologies Ltd, Tel Aviv (IL)

( * ) Notice: Subject to any disclaimer, the term of this patent is extended or adjusted under 35 U.S.C. 154(b) by 411 days.

(21) Appl. No.: 17/976,958

(22) Filed: Oct. 31, 2022

(65) Prior Publication Data

US 2024/0147525 A1    May 2, 2024

(51) Int. Cl.
| | |
|---|---|
| *H04W 74/08* | (2024.01) |
| *H04W 72/0446* | (2023.01) |
| *H04W 72/0453* | (2023.01) |
| *H04W 72/21* | (2023.01) |
| *H04W 74/0808* | (2024.01) |

(52) U.S. Cl.
CPC ... *H04W 74/0808* (2013.01); *H04W 72/0446* (2013.01); *H04W 72/0453* (2013.01); *H04W 72/21* (2023.01)

(58) Field of Classification Search
CPC ........... H04W 64/006; H04W 74/0808; H04W 72/0446; H04W 72/21; H04W 72/0453; H04W 74/0816
See application file for complete search history.

(56) References Cited

U.S. PATENT DOCUMENTS

| | | |
|---|---|---|
| 8,504,063 B2 | 8/2013 | Ekbatani |
| 8,848,730 B1 | 9/2014 | Meugels et al. |
| 9,380,607 B2 | 6/2016 | Bourlas et al. |
| 9,814,051 B1 | 11/2017 | Shpak |
| 9,838,536 B2 | 12/2017 | Jung et al. |
| 10,153,857 B1 * | 12/2018 | Chu ............... H04W 72/21 |
| 10,306,506 B2 | 5/2019 | Dinan |

(Continued)

FOREIGN PATENT DOCUMENTS

| | | |
|---|---|---|
| CN | 106101047 A | 11/2016 |
| EP | 1710960 B1 | 12/2008 |

(Continued)

OTHER PUBLICATIONS

CN Application # 20208009536.2 Office Action dated Jan. 28, 2023.

(Continued)

*Primary Examiner* — Brian D Nguyen
(74) *Attorney, Agent, or Firm* — Meitar Patents Ltd.; Daniel Kligler

(57) ABSTRACT

A method for communication includes simultaneously transmitting over a wireless network from a first station to a second station at least first and second request-to-send (RTS) frames in different, respective first and second frequency channels. The first station receives first and second clear-to-send (CTS) frames transmitted in the first and second frequency channels, respectively, by the second station over the wireless network in response to the first and second RTS frames. At least one property associated with the first station is estimated by processing information extracted from both the first and second received CTS frames.

30 Claims, 2 Drawing Sheets

(56) References Cited

U.S. PATENT DOCUMENTS

| | | | |
|---|---|---|---|
| 11,215,688 | B2 | 1/2022 | Shpak |
| 11,240,846 | B2 | 2/2022 | Shpak |
| 2003/0048770 | A1 | 3/2003 | Proctor |
| 2003/0169763 | A1 | 9/2003 | Choi et al. |
| 2004/0013128 | A1 | 1/2004 | Moreton et al. |
| 2005/0207381 | A1 | 9/2005 | Aljadeff et al. |
| 2009/0243932 | A1 | 10/2009 | Moshfeghi |
| 2010/0085950 | A1 | 4/2010 | Sekiya et al. |
| 2010/0302102 | A1 | 12/2010 | Desai et al. |
| 2012/0063340 | A1 | 3/2012 | Waters et al. |
| 2013/0136013 | A1 | 5/2013 | Kneckt et al. |
| 2014/0327579 | A1* | 11/2014 | Hart .................. G01S 3/48 342/442 |
| 2014/0334387 | A1 | 11/2014 | Doppler et al. |
| 2015/0012971 | A1 | 1/2015 | Ram et al. |
| 2015/0312278 | A1 | 10/2015 | Wentink et al. |
| 2015/0312279 | A1 | 10/2015 | Wentink et al. |
| 2016/0366548 | A1 | 12/2016 | Wang et al. |
| 2018/0084386 | A1 | 3/2018 | Shpak |
| 2018/0098355 | A1 | 4/2018 | Islam et al. |
| 2018/0227944 | A1 | 8/2018 | Yerramalli et al. |
| 2018/0235004 | A1 | 8/2018 | Cheong et al. |
| 2018/0343589 | A1* | 11/2018 | Li .................. H04W 74/08 |
| 2019/0021116 | A1 | 1/2019 | Fan et al. |
| 2019/0082467 | A1 | 3/2019 | Nunome et al. |
| 2019/0364492 | A1 | 11/2019 | Azizi et al. |
| 2020/0314904 | A1 | 10/2020 | Fodor et al. |
| 2021/0111766 | A1 | 4/2021 | Murakami |
| 2021/0286043 | A1 | 9/2021 | Shpak |
| 2022/0361244 | A1 | 11/2022 | Shpak |

FOREIGN PATENT DOCUMENTS

| | | | | |
|---|---|---|---|---|
| EP | 3039926 | B1 * | 10/2020 | ........ H04W 72/0406 |
| EP | 4198560 | A1 * | 6/2023 | ........... G01S 13/003 |
| WO | 03058887 | A1 | 7/2003 | |
| WO | 03088626 | A2 | 10/2003 | |
| WO | 2015061949 | A1 | 5/2015 | |
| WO | 2017105310 | A1 | 6/2017 | |
| WO | 2017196510 | A1 | 11/2017 | |

OTHER PUBLICATIONS

JP Application # 2022545009 Office Action Mar. 7, 2023.
EP Application # 20917398.8 Search Report dated Feb. 5, 2024.
U.S. Appl. No. 17/866,620 Office Action dated Oct. 22, 2024.
CN Application #20208009536.2 Office Action dated Sep. 6, 2023.
Kotaru et al., "SpotFi: Decimeter Level Localization using WiFi", SIGCOMM '15, London, UK, pp. 269-282, Aug. 17-21, 2015.
IEEE Std 802.11-2012, "IEEE Standard for Information technology—Telecommunications and information exchange between systems—Local and Metropolitan Area Networks—Specific Requirements, Part 11: Wireless LAN Medium Access Control (MAC) and Physical Layer (PHY) Specifications," Section 9.3.2.4, pp. 828-829, year 2012.
IEEE Std 802.11ac-2013, "IEEE Standard for Information technology—Telecommunications and information exchange between systems—Local and metropolitan area networks—Specific requirements—Part 11: Wireless LAN Medium Access Control (MAC) and Physical Layer (PHY) Specifications—Amendment 4: Enhancements for Very High Throughput for Operation in Bands below 6 GHz," pp. 1-425, year 2013.
IEEE Std 802.11n-2009, "IEEE Standard for Information technology—Telecommunications and information exchange between systems—Local and metropolitan area networks—Specific requirements—Part 11: Wireless LAN Medium Access Control (MAC) and Physical Layer (PHY) Specifications—Amendment 5: Enhancements for Higher Throughput," pp. 1-536, year 2009.
IEEE Std 802.11g-2003, "IEEE Standard for Information technology—Telecommunications and information exchange between systems—Local and metropolitan area networks—Specific requirements—Part 11: Wireless LAN Medium Access Control (MAC) and Physical Layer (PHY) Specifications—Amendment 4: Further Higher Data Rate Extension In the 2.4 GHZ Band," pp. 30-67, year 2003.
IEEE Std 802.11b-1999/Cor Jan. 2001, "IEEE Standard for Information technology—Telecommunications and information exchange between systems—Local and metropolitan area networks—Specific requirements—Part 11: Wireless LAN Medium Access Control (MAC) and Physical Layer (PHY) Specifications—Amendment 2: Higher-speed Physical Layer (PHY) extension in the 2.4 GHz Band—Corrigendum 1," pp. 1-23, year 2001.
IEEE Std 802.11a-1999, "IEEE Standard for Information technology—Telecommunications and information exchange between systems—Local and metropolitan area networks—Specific requirements—Part 11: Wireless Medium Access Control (MAC) and Physical Layer (PHY) specifications: High Speed Physical Layer in the 5 GHz band," pp. 1-90, year 1999.
IN Application # 202247042005 Office Action dated Oct. 26, 2022.

* cited by examiner

ANONYMOUS COLLECTION OF BROADBAND DIRECTIONAL TRANSMISSIONS

FIELD

The present invention relates generally to wireless communication systems, and particularly to methods for localization based on wireless network signals.

BACKGROUND

The RTS/CTS (request to send/clear to send) mechanism is used in WLANs for the purpose of carrier sensing and collision avoidance, in accordance with the IEEE 802.11 medium access control (MAC) standard. Stations in a WLAN maintain a network allocation vector (NAV) to indicate the time during which the wireless medium is considered to be busy, and update the NAV using the RTS/CTS mechanism, as described, for example, in section 9.3.2.4 of the IEEE 802.11-2012 standard. An originating station transmits an RTS frame over the WLAN, with a receiver address (RA) indicating the MAC address of the station to which the frame is directed and a transmitter address (TA) indicating the MAC address of the station transmitting the frame. Upon receiving the RTS frame, the receiving station transmits a CTS frame, in which the RA is set to the TA value of the RTS frame. Stations that receive the RTS or CTS frame update their NAV settings and refrain from transmission for a period indicated by the NAV value. During this period, the originating station is able to transmit one or more data frames over the WLAN without contention.

U.S. Pat. No. 11,240,846, whose disclosure is incorporated herein by reference, describes a method for communication that includes detecting, at a first station in a wireless network, a beacon transmitted over the wireless network by a second station having multiple antennas. In response to the beacon, a request-to-send (RTS) frame is transmitted over the wireless network using a multi-carrier modulation scheme from the first station to the second station. The first station receives a clear-to-send (CTS) frame transmitted over the wireless network, in response to the RTS frame, by the second station via the multiple antennas using the multi-carrier modulation scheme, and estimates an angle of transmission from the second station to the first station based on the received CTS frame.

U.S. Pat. No. 9,814,051, whose disclosure is incorporated herein by reference, describes a method for identifying the angle of departure of multi-antenna transmitters. The method includes receiving at a given location at least first and second signals transmitted respectively from at least first and second antennas of a wireless transmitter. The at least first and second signals encode identical data using a multi-carrier encoding scheme with a predefined cyclic delay between the transmitted signals. The received first and second signals are processed, using the cyclic delay, in order to derive a measure of a phase delay between the first and second signals. Based on the measure of the phase delay, an angle of departure of the first and second signals from the wireless access point to the given location is estimated. Additional methods for identifying angles of departure are described in U.S. Pat. No. 11,215,688, whose disclosure is likewise incorporated herein by reference.

The description above is presented as a general overview of related art in this field and should not be construed as an admission that any of the information it contains constitutes prior art against the present patent application. Documents incorporated by reference in the present patent specification are to be considered an integral part of the specification except that, to the extent that any terms are defined in these incorporated documents in a manner that conflicts with definitions made explicitly or implicitly in the present specification, only the definitions in the present specification should be considered.

SUMMARY

Embodiments of the present invention that are described hereinbelow provide improved methods and systems for communication by stations in a wireless network.

There is therefore provided, in accordance with an embodiment of the invention, a method for communication, which includes simultaneously transmitting over a wireless network from a first station to a second station at least first and second request-to-send (RTS) frames in different, respective first and second frequency channel. First and second clear-to-send (CTS) frames transmitted in the first and second frequency channels, respectively, by the second station over the wireless network, in response to the first and second RTS frames, are received at the first station. At least one property associated with the first station is estimated by processing information extracted from both the first and second received CTS frames.

In a disclosed embodiment, the first and second frequency channels occupy mutually adjacent frequency bands. Additionally or alternatively, transmitting at least the first and second RTS frames includes transmitting four RTS frames, including the first and second RTS frames, in four respective frequency channels, and estimating the at least one property includes processing up to four CTS frames received in response to the four RTS frames.

Further additionally or alternatively, simultaneously transmitting at least the first and second RTS frames includes detecting a beacon transmitted over the wireless network by the second station in the first frequency channel, and transmitting at least the first and second RTS frames in response to the beacon. In one embodiment, detecting the beacon includes identifying, at the first station, a signal transmitted by the second station using a single-carrier modulation scheme as the beacon, and transmitting at least the first and second RTS frames includes modulating the RTS frames using a multi-carrier modulation scheme, whereby the CTS frames are also modulated using the multi-carrier modulation scheme. For example, the single-carrier modulation scheme may be a complementary code keying (CCK) scheme, while the multi-carrier modulation scheme is an orthogonal frequency-division multiplexing (OFDM) scheme.

In a disclosed embodiment, after receiving the first and second CTS frames, the first station does not transmit further frames to the second station for at least 100 ms.

In some embodiments, the first station is a mobile station in a wireless local area network (WLAN), and the second station is a stationary access point (AP) in the WLAN. In a disclosed embodiment, transmitting the first and at least the second RTS frames and receiving the first and second CTS frames include transmitting and receiving the RTS and CTS frames to and from the AP without establishing an association between the mobile station and the AP.

In some embodiments, estimating the at least one property includes selecting at least a first frequency bin within the first frequency channel and at least a second frequency bin within the second frequency channel, extracting at least first and second signals from at least the first and second frequency bins, respectively, and computing the at least one property based on at least the first and second signals.

Additionally or alternatively, estimating the at least one property includes processing the first and second CTS frames to find an angle of transmission from the second station to the first station.

Further additionally or alternatively, estimating the at least one property includes processing the first and second CTS frames to extract channel state information (CSI), and computing a value of the at least one property using the extracted CSI.

In some embodiments, estimating the at least one property includes processing the first and second CTS frames to find a location of the first station and/or to find a velocity of the first station.

In one embodiment, the method further includes receiving the first and second CTS frames from the second station at a third station, which did not transmit the RTS frames, and estimating an angle of transmission from the second station to the third station based on the received CTS frames.

There is also provided, in accordance with an embodiment of the invention, apparatus for communication, including a transceiver, which is configured to transmit and receive signals over a wireless network, and a processor, which is configured to drive the transceiver to transmit simultaneously to a station in the wireless network at least first and second request-to-send (RTS) frames in different, respective first and second frequency channels, to extract information from both first and second clear-to-send (CTS) frames received over the wireless network by the transceiver in the first and second frequency channels, respectively, in response to the first and second RTS frames, and to process the extracted information in order to estimate at least one property associated with the apparatus.

There is additionally provided, in accordance with an embodiment of the invention, a computer software product, including a non-transitory computer-readable medium in which program instructions are stored, which instructions, when read by a processor, cause the processor to drive a transceiver to transmit simultaneously to a station in a wireless network at least first and second request-to-send (RTS) frames in different, respective first and second frequency channels, to extract information from both first and second clear-to-send (CTS) frames received over the wireless network by the transceiver in the first and second frequency channels, respectively, in response to the first and second RTS frames, and to process the extracted information in order to estimate at least one property associated with the transceiver.

The present invention will be more fully understood from the following detailed description of the embodiments thereof, taken together with the drawings in which:

DETAILED DESCRIPTION

Overview

Figure 1:
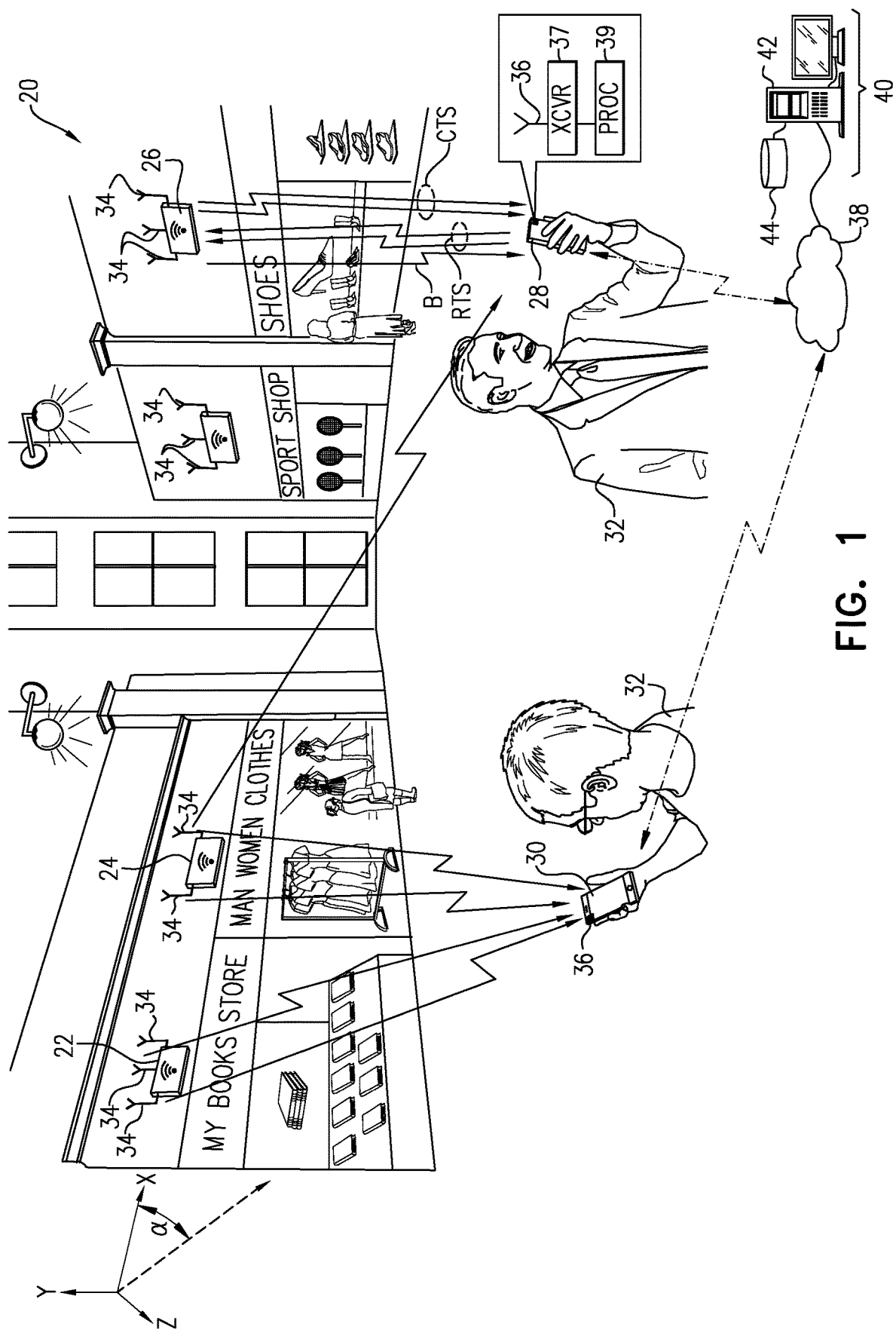
FIG. 1 is schematic, pictorial illustration of a system for wireless communication, in accordance with an embodiment of the invention.

In a WLAN that operates in accordance with IEEE 802.11 standards, access points (APs) transmit beacon frames (commonly referred to simply as "beacons") periodically in order to announce their presence and synchronize members of their service set. The beacon includes the basic service set identifier (BSSID) of the transmitting AP and contains information regarding the capabilities of the AP. In earlier members of the IEEE 802.11 family, such as IEEE 802.11a and IEEE 802.11b, a pair of stations could communicate over a single frequency channel, having a default bandwidth of 20 MHz. According to some of these earlier standards, such as IEEE 802.11b, APs transmit beacons using a single-carrier modulation scheme: complementary code keying (CCK).

In members of the IEEE 802.11 family of standards that are now in common use, such as IEEE 802.11n, APs transmit downlink signals, including beacons, via multiple antennas using a multi-carrier modulation scheme, specifically orthogonal frequency-division multiplexing (OFDM). The AP introduces a predefined cyclic delay between the respective signals that are transmitted by the different antennas. The above-mentioned U.S. Pat. No. 9,814,051 explains how this cyclic delay can be used by a receiver in estimating the phase delay between the signals from the different antennas, and how the receiver can use this phase delay in finding the angle of departure of the signals from the AP to the receiver (for example in col. 13, line 11-col 18, line 45). One advantage of this approach is that it enables even a mobile station with only a single antenna to find angles of departure from APs to the mobile station without requiring the mobile station to establish an association with the BSSID of any of the APs.

Newer members of the IEEE 802.11 family, such as IEEE 802.11n and 802.11ac, also support channel bonding, which enables higher communication throughput by increasing the bandwidth between stations in the WLAN. In contrast to earlier standards, such as IEEE 802.11a, which were limited to a single 20 MHz frequency channel, IEEE 802.11ac allows multiple adjacent frequency channels to be bonded together, thus enabling stations to exchange data over a bandwidth of 40 MHz on a pair of channels, or even 80 or 160 MHz over larger groups of channels.

To maintain backward-compatibility with legacy stations, APs with more advanced capabilities, as provided by IEEE 802.11n and IEEE 802.11ac, still transmit beacons over only a single frequency channel, referred to as the primary channel. When operating in the 2.4 GHz band, the beacons are typically transmitted omnidirectionally, from a single antenna among the multiple antennas of the AP, using complementary code keying (CCK), which is a single-carrier modulation scheme. Therefore, these beacons do not provide mobile stations with the phase information that is needed in order to find properties such as the angle of departure from the AP to the mobile station. After a mobile station with 802.11n or 802.11ac capabilities associates with the AP, the AP will transmit OFDM signals via its multiple antennas to the mobile station. This association process is time-consuming, however, and requires the mobile station to present credentials, which the mobile station may not have. This requirement creates difficulty in finding the location of the mobile station based on AP transmissions.

In response to this problem, the above-mentioned U.S. Pat. No. 11,240,846 provides techniques that can be used by a mobile station in inducing APs to transmit multi-carrier signals via their multiple antennas, without requiring any sort of association between the mobile station and the APs. These techniques take advantage of the RTS/CTS mechanism that is described above. This mechanism is commonly implemented in hardware logic of the AP and is independent of any sort of association state between the stations in the WLAN. It can thus be carried out quickly, between the mobile station and multiple different access points in turn.

Even APs with channel-bonding capabilities, as provided by IEEE 802.11ac, for example, may still transmit RTS and CTS frames over only a single frequency channel in order to maintain backward-compatibility with standards such as IEEE 802.11a. To initiate channel bonding after a pair of 802.11ac stations (such as a mobile station and an AP) has completed the association process, one of the stations transmits multiple RTS frames simultaneously over two or more adjacent frequency channels, with an indication of the station's bonding capability. Assuming the channels are clear, the other station responds by transmitting CTS frames over the same frequency channels. (When the responding station detects that one or more of the channels are not clear, it will transmit CTS frames only over the channel or channels that are clear, or possibly will not respond at all when all channels are busy.) After completion of the RTS/CTS exchange, the stations may commence high-throughput communication over the bonded group of frequency channels.

Embodiments of the present invention that are described herein take advantage of this simultaneous, multi-channel RTS/CTS mechanism to improve on the techniques described in the above-mentioned U.S. Pat. No. 11,240,846. In the present embodiments, when a station detects a beacon transmitted over a wireless network in a given frequency channel by another station, such as an AP, the station simultaneously transmits an RTS frame in the given frequency channel and one or more additional RTS frames in one or more additional (typically adjacent) frequency channels. The other station responds, as mandated by the standard, by transmitting CTS frames in these same frequency channels. As noted above, the CTS response mechanism is typically implemented in hardware logic of the AP and is independent of any association between the stations involved.

The station that sent the simultaneous RTS frames will thus receive two or more CTS frames simultaneously in different frequency channels. The station extracts and processes information from all the received CTS frames in order to estimate a property, such as angle of transmission, location, or velocity, for example. Although each of the CTS frames is transmitted in its own, separate frequency band, all the CTS frames are typically coherent, because they are all generated using the same frequency synthesizer in the transmitting station. Thus, for purposes of extracting information and estimating properties, the station receiving the CTS frames can treat them as though they were all parts of a single, broadband transmission.

The increased overall bandwidth of the received CTS frames is useful in improving the precision of measurements made at the receiving station. For this purpose, for example, the receiving station may extract and process signals from respective frequency bins that are distributed over two or more frequency channels over which the CTS frames are received. The increased frequency range improves the precision of both frequency-based measurements of angle, such as angles of transmission and reception of the signals, and measurements of distance and location, such as measurements based on time of flight, as described in U.S. Patent Application Publication 2021/0286043, whose disclosure is incorporated herein by reference.

System Description

FIG. 1 is schematic, pictorial illustration of a system 20 for wireless communications and position finding, in accordance with an embodiment of the invention. By way of example, FIG. 1 shows a typical environment, such as a shopping mall or street, in which multiple access points 22, 24, 26, . . . , are deployed, often by different WLAN proprietors independently of one another. (The notation " . . . " is used in enumerating items of a given type in the present description to indicate that the pictured instances of the given type of item may be part of a larger group of such items.) Signals transmitted by the access points are received by receivers in the form of mobile stations 28, 30, . . . , which are operated by users 32 who are free to move around within the area covered by system 20. In the pictured embodiment, stations 28, 30, . . . , are shown as smartphones; but other sorts of mobile transceivers, such as laptop and tablets computers, as well as dedicated radio tags, may be used in similar fashion and can similarly extract information from signals received from access points 22, 24, 26, . . . , as described hereinbelow.

Each of access points 22, 24, 26, . . . , in system 20 is assumed to have two or three antennas 34, as shown in FIG. 1. The principles of the present invention are similarly applicable to fixed transceivers having even greater numbers of antennas. Mobile stations 28, 30, . . . , are each assumed to have a single, omnidirectional antenna 36, which is connected to a radio transceiver 37; but the techniques described herein for detecting angles can similarly be implemented by multi-antenna stations. Transceiver 37 typically comprises suitable analog and digital interface circuits, as are known in the art, including physical layer (PHY) and MAC interfaces.

Each of mobile stations 28, 30, . . . , comprises a respective processor 39, which processes signals received by antenna 36 from antennas 34 in order to extract information and estimate properties of the mobile station, as well as to extract an identifier (such as the BSSID) with regard to each access point. The properties may comprise angles of departure of the signals from the respective access points 22, 24, 26, . . . , for example. These angles of departure are used in finding the angles of orientation between the access points and the mobile stations in the coordinate frame of the access points (marked α in FIG. 1). The mobile stations are able to perform these functions, as described further hereinbelow, without necessarily associating with the access points.

Processor 39 typically comprises an embedded, multi-purpose microprocessor or microcontroller, which performs the functions described herein under the control of suitable software, while invoking the appropriate hardware-based functions of transceiver 37. This software may be stored on tangible, non-transitory computer-readable media, such as optical, magnetic, or electronic memory media. Alternatively or additionally, at least some of the functions of processor 39 may be implemented in programmable or hard-wired logic. Typically, processors 39 also perform other computing and control functions within mobile stations 28, 30, . . . , but these functions are beyond the scope of the present invention.

In the present embodiment, one or more of access points 22, 24, 26, . . . , transmit beacons in accordance with a legacy protocol. For example, an 802.11g access point may transmit beacons compatible with IEEE 802.11b, which mandates that the beacons be transmitted using CCK over a single carrier in the 2.4 GHz band. As another example, an 802.11ac access point may transmit beacons compatible with IEEE 802.11a over a single 20 MHz frequency channel in the 5 GHz band. The beacons provide the BSSID of the transmitting access point.

Upon receiving such a beacon (B) in a given channel, referred to as a "primary channel," a mobile station, such as mobile station 28, will initiate an RTS/CTS exchange with the access point that transmitted the beacon, such as access point 26. The mobile station transmits the RTS frames in the exchange using OFDM signals. In response to the beacon, mobile station 28 simultaneously transmits RTS frames to access point 26 in both the primary frequency channel and in one or more additional frequency channels. This exchange induces the access point to transmit multiple OFDM CTS frames simultaneously in the same frequency channels as the RTS frames, as long as the channels are clear. As noted earlier, access point 26 will transmit the CTS frames without requiring an association between the mobile station and the access point. Furthermore, because access point 26 typically uses a single radio-frequency (RF) synthesizer, at around 5 GHz in the present example, for all the frequency channels, the signals in the frequency channels of all the simultaneous CTS frames are coherent with one another. Based on the received CTS frames, properties such as channel state information (CSI) and angle of departure can be found without necessarily creating an association between the mobile station and the access point. This functionality is described further hereinbelow with reference to FIG. 2.

Mobile stations 28, 30, . . . , may also associate with one or more of access points 22, 24, 26, . . . , for purposes of Internet communications. Alternatively or additionally, the mobile stations may access the Internet via a cellular network or other connection. In any case, mobile stations 28, 30, . . . , may communicate information that they collect via a network 38 to a mapping server 40. This information may be collected and reported autonomously and automatically by a suitable application program ("app") running in the background on processor 39 in the mobile stations. Server 40 may process the data provided by the mobile stations in order to find respective location coordinates of the mobile stations, for example by triangulation, as described in the above-mentioned U.S. Pat. No. 9,814,051.

Server 40 typically comprises a general-purpose computer, comprising a programmable processor 42 and a memory 44. The functions of server 40 that are described herein are typically implemented in software running on processor 42, which may be stored on tangible, non-transitory computer-readable media, such as optical, magnetic, or electronic memory media.

Additionally or alternatively, mobile station 30 may process the received CTS frames in order to estimate other properties of the mobile station, such as location, speed, or periodic variations, without necessarily relying on the angle computations described above. In some embodiments, these properties are estimated on the basis of channel state information (CSI) that mobile station 30 extracts from the received CTS frames. The CSI in multi-carrier communications can be represented as a vector of complex values, wherein each value represents the respective signal propagation properties of one of the carrier frequencies from a given transmitting antenna 34 to antenna 36 of mobile station 30. The CSI values are typically computed by comparing the signals in a certain part of the preamble of a frame received by mobile station 30 to the expected data symbols in the preamble, as is known in the art. The CSI with respect to any given access points 22, 24, 26 varies with the location of mobile station 30 and thus represents a sort of location indicator.

In one embodiment, the CSI values for signals received from access points 22, 24, 26 may be measured and mapped over an area covered by the access points and may be extended over multiple frequency channels within the band served by the access points. This mapping may then be used in finding the location of mobile station 30, by extracting the current CSI values from the signals received by the mobile station and comparing them to the mapped values. By extending the CSI extraction to multiple frequency channels, based on simultaneous transmission of RTS and CTS frames over multiple channels, the accuracy of mapping and location finding can be enhanced.

In addition, the changes in the extracted CSI values over time can be used to estimate the velocity of mobile station 30. Additionally or alternatively, if the mobile station is moving at a sufficient speed to give rise to an appreciable Doppler effect, the resulting variation in the frequencies of the received signals will be reflected by the CSI and can be used to find the velocity. Furthermore, periodic variations in the CSI over time can be indicative of periodic changes in the environment of mobile station 30, such as periodic motion of a body or object to which the mobile station is attached.

When the present techniques are to be used in monitoring the location and/or velocity of mobile station 30, the mobile station will typically transmit a sequence of groups of RTS frames as it moves. Each group comprises two or more RTS frames that are transmitted simultaneously over different frequency channels. The mobile station will then receive multiple, successive groups of simultaneous CTS frames in response to the groups of RTS frames, and will thus make successive multi-channel estimates of CSI and/or transmission angle. In one embodiment, mobile station 30 sets the rate of repetition of the RTS frames in response to the speed of motion of the mobile station, as indicated, for example, by an inertial measurement unit (IMU) in the mobile station or by the CSI-based velocity measurements. When mobile station 30 is stationary, it will refrain from transmitting RTS frames (or will transmit them only occasionally) in order to conserve power and reduce network congestion. As the speed of the mobile station increases, it will increase the rate of RTS transmissions.

Upon receiving the RTS frames from mobile station 30, other stations in the vicinity will refrain from transmission for a certain period; but these other stations will also receive the CTS frames sent in response to the RTS frames and will be able to process the CTS frames in order to extract their own readings of CSI and/or angle.

Inducing and Processing Multi-Channel Transmissions by Access Points

Figure 2:
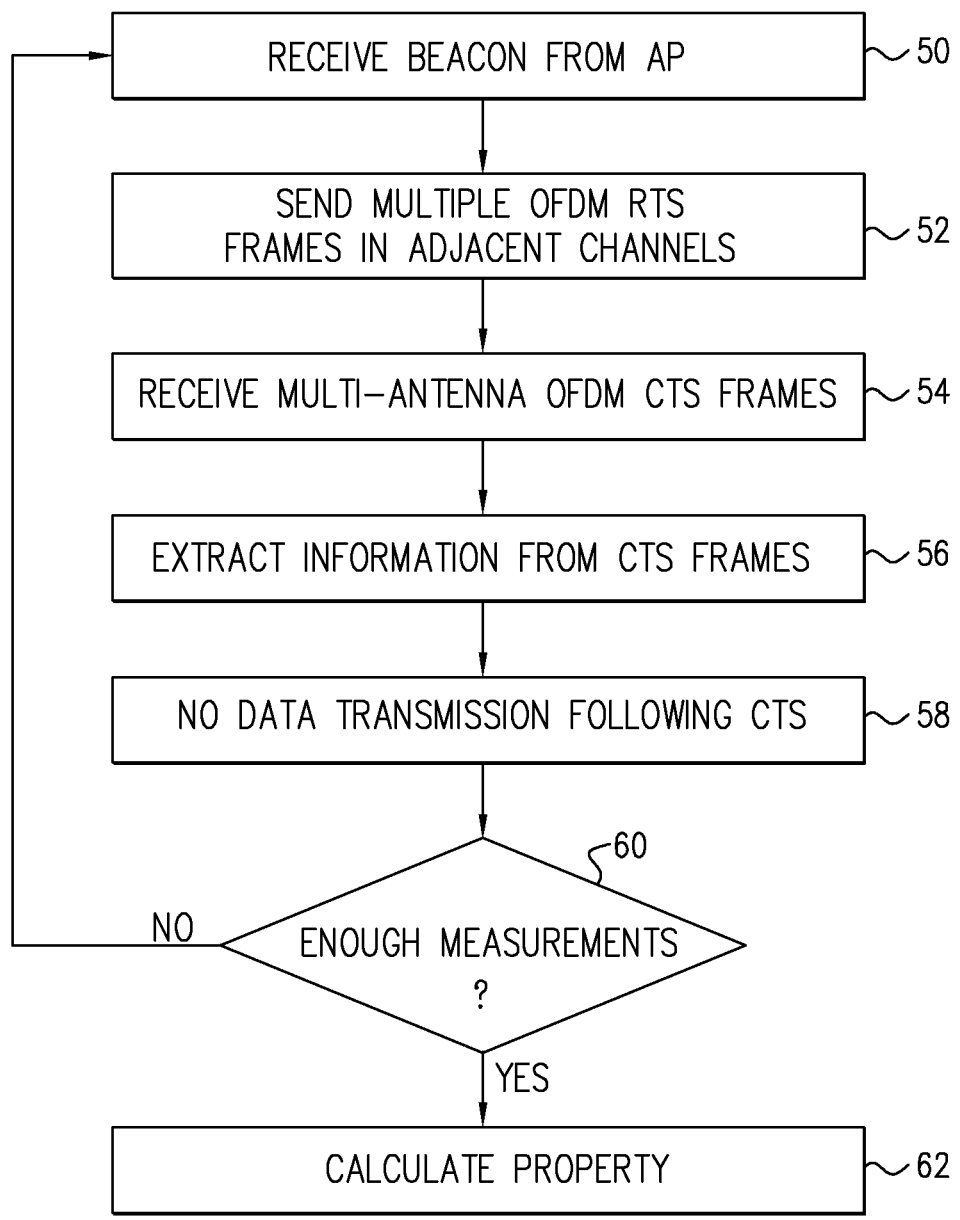
FIG. 2 is a flow chart that schematically illustrates a method for anonymous collection of directional transmissions, in accordance with an embodiment of the invention.

FIG. 2 is a flow chart that schematically illustrates a method for anonymous collection of transmissions, in accordance with an embodiment of the invention. The method is described hereinbelow, for the sake of concreteness and clarity, with reference to the elements of system 20, as shown in FIG. 1 and described above. This method may be used in extracting various sorts of information, such as transmission angle, time of flight, and/or CSI, and in computing values of properties of mobile stations based on the extracted information, as was noted above.

Alternatively, the principles of this method may be applied, mutatis mutandis, in extracting information and computing properties of stations in other sorts of networks that support RTS/CTS and channel-bonding functionality. The networks may operate in accordance with protocols in the IEEE 802.11 family, or in accordance with other wireless protocols that support RTS/CTS and channel bonding or equivalent methods for clear channel assessment and throughput enhancement. The stations implementing the method may be either mobile or stationary. For example, stationary stations may apply the present method in finding locations of mobile stations.

In the present example, mobile station 28 receives beacons from access points 22, 24, 26, . . . , at a beacon reception step 50. Each beacon contains a MAC address in the form of the BSSID of the access point transmitting the beacon. Some of the beacons may be transmitted as multi-antenna OFDM signals; and in such cases mobile station 28 will be able to derive the angle of departure without resorting to an RTS/CTS exchange. In the present example, however, it is assumed that one or more of the beacons are transmitted as single-channel signals, for compatibility with IEEE 802.11a.

Mobile station 28 selects an access point that transmitted a single-channel beacon, for example access point 22, and transmits two or more simultaneous RTS frames to the selected access point, at an RTS transmission step 52. The mobile station transmits the RTS frames, using a suitable OFDM scheme, in both the frequency channel of the beacon (known as the primary channel) and in one or more adjacent channels. The RTS frames typically use a legacy OFDM scheme (rather than a more advanced high-throughput scheme) with cyclic delay diversity (CDD). For example, in accordance with IEEE 802.11ac, mobile station 28 may transmit RTS frames in two, four, or eight adjacent channels.

In an example embodiment, mobile station 28 sets the RA of the RTS frames to be the BSSID of access point 22, as indicated by the beacon received from the access point. The mobile station may insert its own MAC address as the TA in the RTS frames. Alternatively, the mobile station may set the TA to a spoofed value that uniquely encodes the BSSID of access point 22. This spoofing technique and its benefits are described further in the above-mentioned U.S. Pat. No. 11,240,846.

Upon receiving the multiple RTS frames in the respective frequency channels, access point 22 checks whether the channels are all clear. If so, the access point responds by transmitting CTS frames in all the same channels, with the TA of the RTS frames inserted as the RA of the CTS frames. When one or more of the frequency channels are busy, the access point may transmit the CTS frames only in a subset of one or more of the channels that are clear (or possibly in none of the channels). Access point 22 transmits the CTS frames as multi-antenna signals, in the same frequency channels and using the same modulation scheme as the RTS frame, i.e., using OFDM.

Mobile station 28 receives the CTS frames, at a CTS reception step 54. Assuming the TA of the RTS frame was spoofed so as to encode the BSSID of access point 22, the mobile station can now decode the RA of the CTS frame in order to recover the BSSID of the access point. Mobile station 28 extracts information from the respective signals transmitted by access point 22 in the CTS frames, for use in estimating a property associated with the mobile station, at an information extraction step 56. As noted earlier, the extracted information may correspond, for example, to the angle of departure of the signals from access point 22. Additionally or alternatively, the extracted information may comprise CSI, and the property to be estimated may be the location and/or velocity of the mobile station based on the extracted CSI. Further additionally or alternatively, the extracted information may comprise a time of flight of the signals transmitted between access point 22 and mobile station 28.

According to the IEEE 802.11n and 802.11ac standards (as well as other standards in the 802.11 family), access point 22 applies different, respective cyclic shifts to the signals transmitted by its different antennas 34. In one embodiment, mobile station 28 estimates the phase shift between the antennas by selecting one or more pairs of frequency bins in the received signals conveying the CTS frames, and computing a measure of the phase shift using the respective cyclic shifts of the bins as transmitted by the multiple antennas. By appropriate selection of the pairs of bins, it is possible to compute the angle of departure of the signals from access point 22 by applying, for example, a simple linear transformation to the extracted frequency bins. Extension of the choice of frequency bins in the present embodiment over two or more different frequency channels increases the number of available bin pairs and enhances the precision and resilience of the angle measurement.

In one embodiment, the angle computation is based on selection of time-frequency bins, as defined in the above-mentioned U.S. Pat. No. 9,814,051. The term "time-frequency bin" in this context means a sample of the received signal in a given frequency bin taken at a given, predefined time from the start of a frame transmitted by the transmitter. In 802.11 OFDM transmissions, for example, a bin is defined in terms of frequency as one of N predefined complex numbers used in data encoding prior to conversion to the time domain by Inverse Fast Fourier Transform (IFFT), such as N=64 for 20 MHz 802.11 OFDM. The input to the IFFT encoder in OFDM systems (which transforms frequency-domain to time-domain signals) is a fixed-size collection of complex numbers, each corresponding to a frequency bin.

After receiving the CTS frames at step 54, mobile station 28 will typically not transmit further data frames to access point 22 for at least 100 ms, but rather will devote its resources to location-finding and other tasks, at a non-transmission step 58. Mobile station 28 checks (or asks server 40 to check) whether it has collected measurements from a sufficient number of access points to estimate the property of interest, at a sufficiency checking step 60. If the number of measurement is not yet sufficient, the process of FIG. 2 returns to step 50, to receive beacons and initiate RTS/CTS exchanges with other access points.

Once a sufficient number of measurements has been collected, mobile station 28 (or server 40) combines the extracted information to estimate the property of interest, at a property calculation step 62. For example, server 40 may combine angular measurements with the known locations of the stationary access points to estimate the location coordinates of the mobile station. Additionally or alternatively, mobile station 28 (or server 40) may use extracted CSI and/or time-of-flight data in finding location, velocity, and/or other properties.

The embodiments described above are cited by way of example, and the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:
1. A method for communication, comprising:
  simultaneously transmitting over a wireless network from a first station to a second station at least first and second request-to-send (RTS) frames in different, respective first and second frequency channel;

receiving at the first station first and second clear-to-send (CTS) frames transmitted in the first and second frequency channels, respectively, by the second station over the wireless network in response to the first and second RTS frames, wherein the first and second CTS frames are coherent with one another due to being generated using a common frequency synthesizer in the second station; and estimating at least one property associated with the first station by processing information extracted from both the first and second received CTS frames, while treating the first and second CTS frames as parts of a single, broadband transmission due to a coherence of the first and second CTS frames.

2. The method according to claim 1, wherein the first and second frequency channels occupy mutually adjacent frequency bands.

3. The method according to claim 1, wherein transmitting at least the first and second RTS frames comprises transmitting four RTS frames, including the first and second RTS frames, in four respective frequency channels, and wherein estimating the at least one property comprises processing up to four CTS frames received in response to the four RTS frames.

4. The method according to claim 1, wherein simultaneously transmitting at least the first and second RTS frames comprises detecting a beacon transmitted over the wireless network by the second station in the first frequency channel, and transmitting at least the first and second RTS frames in response to the beacon.

5. The method according to claim 4, wherein detecting the beacon comprises identifying, at the first station, a signal transmitted by the second station using a single-carrier modulation scheme as the beacon, and wherein transmitting at least the first and second RTS frames comprises modulating the RTS frames using a multi-carrier modulation scheme, whereby the CTS frames are also modulated using the multi-carrier modulation scheme.

6. The method according to claim 5, wherein the single-carrier modulation scheme is a complementary code keying (CCK) scheme, while the multi-carrier modulation scheme is an orthogonal frequency-division multiplexing (OFDM) scheme.

7. The method according to claim 1, wherein after receiving the first and second CTS frames, the first station does not transmit further frames to the second station for at least 100 ms.

8. The method according to claim 1, wherein the first station is a mobile station in a wireless local area network (WLAN), and the second station is a stationary access point (AP) in the WLAN.

9. The method according to claim 8, wherein transmitting the first and at least the second RTS frames and receiving the first and second CTS frames comprise transmitting and receiving the RTS and CTS frames to and from the AP without establishing an association between the mobile station and the AP.

10. The method according to claim 1, wherein estimating the at least one property comprises:

selecting at least a first frequency bin within the first frequency channel and at least a second frequency bin within the second frequency channel;

extracting at least first and second signals from at least the first and second frequency bins, respectively; and computing the at least one property based on at least the first and second signals.

11. The method according to claim 1, wherein estimating the at least one property comprises processing the first and second CTS frames to find an angle of transmission from the second station to the first station.

12. The method according to claim 1, wherein estimating the at least one property comprises processing the first and second CTS frames to extract channel state information (CSI), and computing a value of the at least one property using the extracted CSI.

13. The method according to claim 1, wherein estimating the at least one property comprises processing the first and second CTS frames to find a location of the first station.

14. The method according to claim 1, wherein estimating the at least one property comprises processing the first and second CTS frames to find a velocity of the first station.

15. The method according to claim 1, wherein the method further comprises receiving the first and second CTS frames from the second station at a third station, which did not transmit the RTS frames, and estimating an angle of transmission from the second station to the third station based on the received CTS frames.

16. Apparatus for communication, comprising:

a transceiver, which is configured to transmit and receive signals over a wireless network; and a processor, which is configured to drive the transceiver to transmit simultaneously to a station in the wireless network at least first and second request-to-send (RTS) frames in different, respective first and second frequency channels, to extract information from both first and second clear-to-send (CTS) frames received over the wireless network by the transceiver in the first and second frequency channels, respectively, in response to the first and second RTS frames, wherein the first and second CTS frames are coherent with one another due to being generated using a common frequency synthesizer in the station, and to process the extracted information in order to estimate at least one property associated with the apparatus, while treating the first and second CTS frames as parts of a single, broadband transmission due to a coherence of the first and second CTS frames.

17. The apparatus according to claim 16, wherein the first and second frequency channels occupy mutually adjacent frequency bands.

18. The apparatus according to claim 16, wherein the processor is configured to drive the transceiver to transmit four RTS frames, including the first and second RTS frames, in four respective frequency channels, and to extract and process the information from up to four CTS frames received in response to the four RTS frames.

19. The apparatus according to claim 16, wherein the transceiver is configured to detect a beacon transmitted over the wireless network by the station in the first frequency channel, and the processor is configured to drive the transceiver to transmit at least the first and second RTS frames in response to the beacon.

20. The apparatus according to claim 19, wherein the beacon is transmitted by the station using a single-carrier modulation scheme, and wherein the processor is configured to drive the transceiver to modulate at least the first and second RTS frames using a multi-carrier modulation scheme, whereby the CTS frames are also modulated using the multi-carrier modulation scheme.

21. The apparatus according to claim 20, wherein the single-carrier modulation scheme is a complementary code keying (CCK) scheme, while the multi-carrier modulation scheme is an orthogonal frequency-division multiplexing (OFDM) scheme.

22. The apparatus according to claim 16, wherein after receiving the first and second CTS frames, the processor does not transmit further frames to the station for at least 100 ms.

23. The apparatus according to claim 16, wherein the transceiver is configured for operation in a mobile station in a wireless local area network (WLAN), and the station is a stationary access point (AP) in the WLAN.

24. The apparatus according to claim 23, wherein the mobile station is configured to transmit the first and at least the second RTS frames and to receive the first and second CTS frames to and from the AP without establishing an association between the mobile station and the AP.

25. The apparatus according to claim 16, wherein the processor is configured to estimate the at least one property by selecting at least a first frequency bin within the first frequency channel and at least a second frequency bin within the second frequency channel, extracting at least first and second signals from at least the first and second frequency bins, respectively, and computing the at least one property based on at least the first and second signals.

26. The apparatus according to claim 16, wherein the processor is configured to process the first and second CTS frames to find an angle of transmission from the second station to the first station.

27. The apparatus according to claim 16, wherein the processor is configured to process the first and second CTS frames to extract channel state information (CSI), and to compute a value of the at least one property using the extracted CSI.

28. The apparatus according to claim 16, the processor is configured to process the first and second CTS frames to find a location of the apparatus.

29. The apparatus according to claim 16, the processor is configured to process the first and second CTS frames to find a velocity of the first station.

30. A computer software product, comprising a non-transitory computer-readable medium in which program instructions are stored, which instructions, when read by a processor, cause the processor to drive a transceiver to transmit simultaneously to a station in a wireless network at least first and second request-to-send (RTS) frames in different, respective first and second frequency channels, to extract information from both first and second clear-to-send (CTS) frames received over the wireless network by the transceiver in the first and second frequency channels, respectively, wherein the first and second CTS frames are coherent with one another due to being generated using a common frequency synthesizer in the station, in response to the first and second RTS frames, and to process the extracted information in order to estimate at least one property associated with the transceiver, while treating the first and second CTS frames as parts of a single, broadband transmission due to a coherence of the first and second CTS frames.

* * * * *